United States Patent [19]

Kogure et al.

[11] Patent Number: 5,373,883

[45] Date of Patent: * Dec. 20, 1994

[54] PNEUMATIC RADIAL TIRE FOR PASSENGER CAR

[75] Inventors: Tomohiko Kogure, Ashigara; Masakazu Okihara, Hiratsuka, both of Japan

[73] Assignee: The Yokohama Rubber Co., Ltd., Tokyo, Japan

[*] Notice: The portion of the term of this patent subsequent to Dec. 6, 2011 has been disclaimed.

[21] Appl. No.: 850,373

[22] Filed: Mar. 12, 1992

[30] Foreign Application Priority Data

Apr. 12, 1991 [JP] Japan .................. 3-79855

[51] Int. Cl.$^5$ .................................. B60C 11/04
[52] U.S. Cl. .................... 152/209 R; 152/527
[58] Field of Search ............... 152/209 R, 209 D, 526, 152/527, 529

[56] References Cited

U.S. PATENT DOCUMENTS

| | | |
|---|---|---|
| 3,985,173 | 10/1976 | Masson .................. 152/529 |
| 4,469,157 | 9/1984 | Morikawa et al. .......... 152/529 |
| 4,602,666 | 7/1986 | Kobe et al. .............. 152/537 |
| 4,819,705 | 4/1989 | Caritta .................. 152/527 |
| 4,854,360 | 8/1989 | Nagumi et al. ............ 152/529 |
| 4,884,607 | 12/1989 | Mori ..................... 152/209 R |
| 4,986,324 | 1/1991 | Suzuki et al. ............ 152/209 R |
| 5,000,239 | 3/1991 | Brayer et al. ............ 152/209 R |
| 5,135,038 | 8/1991 | Graas et al. ............. 152/209 R |

FOREIGN PATENT DOCUMENTS 2066171 7/1981 United Kingdom ............ 152/209 R

OTHER PUBLICATIONS

"Pneumatic Tyre Design" E. C. Woods; 1955 pp. 32–34.
1992 Year Book The Tire and Rim Association, Inc., pp. 1-01, 1-06, 1-08, 1-10, and 1-12.

*Primary Examiner*—Michael W. Ball
*Assistant Examiner*—Nancy T. Krawczyk
*Attorney, Agent, or Firm*—Nikaido, Marmelstein, Murray & Oram

[57] ABSTRACT

A pneumatic radial tire for a passenger car, which includes a plurality of grooves provided on the surface of a tread and extending at least in a tire circumferential direction and a belt having a double layer structure and provided within the tread, characterized in that the depth of the grooves is in the range of 6.0 to 8.5 mm, the thickness of a rubber under the groove defined as the distance from the bottom of the groove to the outermost belt layer is in the range of 0.5 to 2.5 mm, one of the belt layers comprises aramid fiber cords with the other belt layer comprising steel cords, and the total sectional area, $a$, of steel wires per 50 mm width of the belt layer comprising steel cords is 5 to 14 mm$^2$.

7 Claims, 3 Drawing Sheets

PNEUMATIC RADIAL TIRE FOR PASSENGER CAR

BACKGROUND OF THE INVENTION

The present invention relates to a pneumatic radial tire for a passenger car improved in the driving stability with a reduction in the weight of the tread belt structure.

Environmental pollution spreading on an earth scale in recent years has brought about a strong demand for a further lowering in the fuel consumption of vehicles, and, as a part of it, a reduction in the weight of the tire has become brought to the fore as a large technical task.

In a pneumatic radial tire for a passenger car, it is known that a high driving stability can be attained when the belt layer comprises steel cords because the steel cords are far superior in the strength and the modulus of elasticity to other fiber cords. The steel cords, however, unfavorably increase the weight of the tire and the fuel consumption due to its high specific gravity, so that it is difficult for them to cope with the above-described technical task.

Aramid fiber cords have been proposed as a tire cord material having properties close to the steel cords. They have a high strength and a modulus of elasticity comparable to those of the steel cords and can contribute to a reduction in the weight of the tire because the specific gravity is smaller than that of the steel cords. For example, it is known that the weight of the tire can be reduced by as large as about 5 to 8% through a mere replacement of the steel cords of the belt layer with the aramid fiber cords.

Since, however, the compressive rigidity of the aramid fiber cords is substantially equal to zero, the bending rigidity when a bending deformation is applied is disadvantageously low. For this reason, the cornering power in the case where the belt structure is the same as the belt structure comprising steel cords except that the belt cords are replaced with aramid fiber cords is as low as 75% of the cornering power attained by the belt layer comprising steel cords. Therefore, an attainment of the driving stability comparable to that of the tire having a belt structure comprising steel cords has been viewed as practically impossible when use is made of aramid fiber cords.

SUMMARY OF THE INVENTION

An object of the present invention is to provide a pneumatic radial tire for a passenger car which can exhibit a driving stability comparable to or better than that of the conventional tire having a belt layer comprising steel cords with a reduction in the weight of the tire through the use of aramid fiber cords in the belt structure.

In order to attain the above-described object, the pneumatic radial tire for a passenger car according to the present invention includes a plurality of grooves provided on the surface of a tread and extending at least in a tire circumferential direction and a belt having a double layer structure and provided within the tread, characterized in that the depth of the grooves is in the range of 6.0 to 8.5 mm, the thickness of a rubber under the groove defined as the distance from the bottom of the groove to the outermost belt layer is in the range of 0.5 to 2.5 mm, one of the belt layers comprises aramid fiber cords with the other belt layer comprising steel cords, and the total sectional area, $a$, of steel wires per 50 mm width of the belt layer comprising steel cords is 5 to 14 $mm^2$.

As described above, in the tire of the present invention, one of the belt layers comprises aramid fiber cords with the other belt layer comprising steel cords, the groove depth and the thickness of rubber under the groove are smaller than those of the conventional tire, and the total sectional area, $a$, of steel wires per 50 mm width of the belt layer comprising steel cords is 5 to 14 $mm^2$. A combination of these constitutional features enables the cornering power to be improved to a level comparable to or higher than that of the conventional tire having two belt layers each comprising steel cords while enjoying a reduction in the weight of the tire.

In the present invention, as shown in FIG. 2, the term "groove depth (d)" is intended to mean a distance measured to the deepest point of the bottom of the groove in a direction normal to the tread surface. The term "thickness (t) of rubber under the grooves" is intended to mean a distance from the deepest point of the bottom of the groove to the cord surface of the outer belt layer (4$u$) and defined as a distance to the outer belt layer independently of whether or not the belt lyaer is covered with the belt cover layer. Further, the expression "total sectional area, $a(mm^2)$, of steel wires per 50 mm width of the belt layer comprising steel cords" is intended to mean a value represented by the following equation:

$$a(mm^2) = n \times (\pi/4) \, d^2 \times E$$

wherein E represents an end count of steel cords per 50 mm width which appear on the cut surface of the belt layer when the tire is cut in the radial direction;

n represents the number of element wires per cord; and d represents the diameter of the element wire, mm.

DETAILED DESCRIPTION OF THE INVENTION

Figure 1:
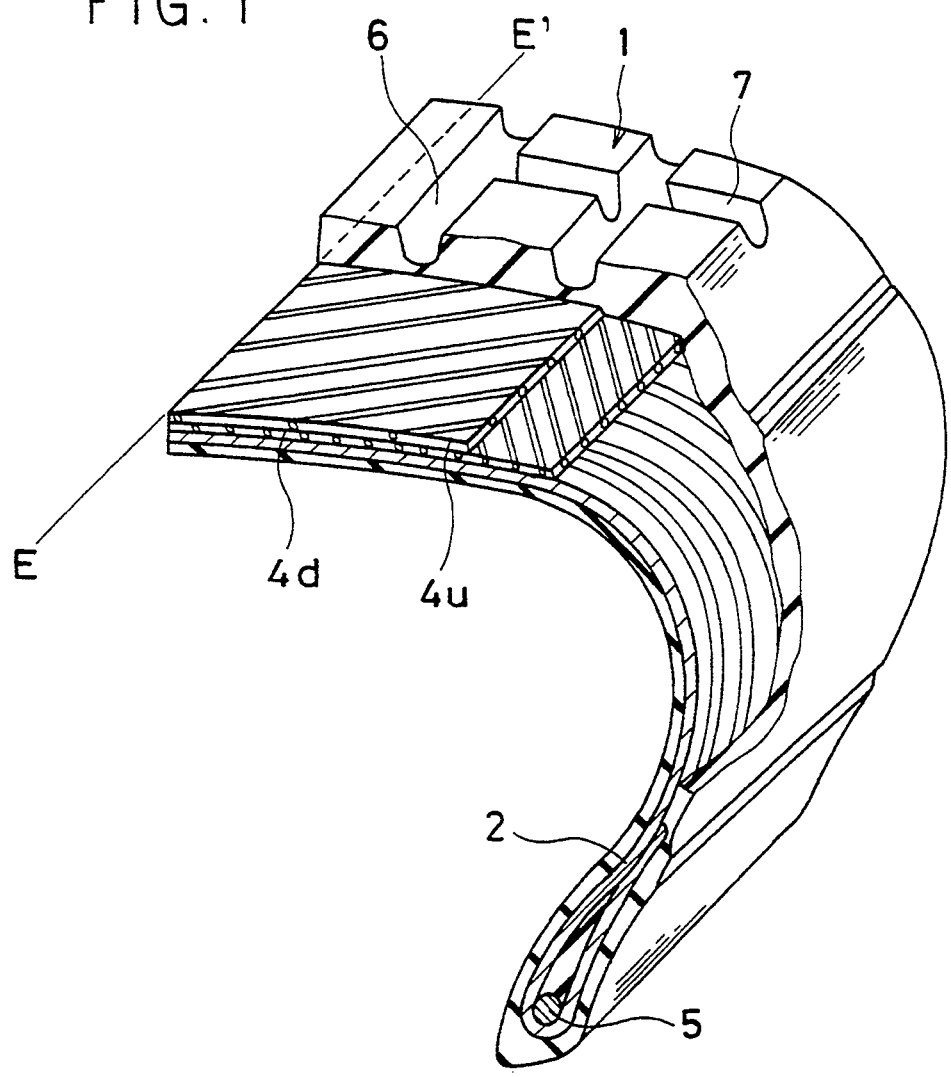
FIG. 1 is a partially cutaway schematic perspective view of a radial tire for a passenger car according to an embodiment of the present invention.
Figure 2:
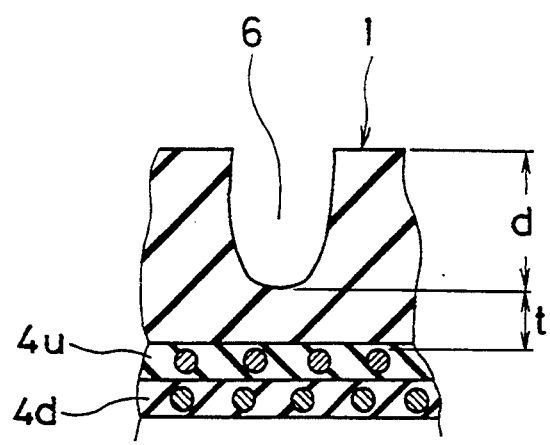
FIG. 2 is an enlarged sectional view of a main groove provided on a tread of the tire according to the present invention.

An embodiment of the pneumatic radial tire for a passenger according to the present invention is shown in FIGS. 1 and 2. In the drawings, numeral 1 denotes a tread, and numeral 2 a carcass layer comprising organic fiber cords such as nylon cords or polyester cords. The carcass layer 2 is folded back and wound up around left and right bead cores 5 from the inside of the tire towards the outside of the tire. The cord angle of the carcass layer 2 to the tire circumferential direction, EE', is substantially 90°. A belt comprising two layers, i.e., an inner belt layer 4d and an outer belt layer 4u, is disposed on the outside of the carcass layer 2 over one round of the tire. Among these two belt layers, i.e., belt layers 4d and 4u, the outer belt layer 4u comprises aramid fiber cords with the inner belt layer 4d comprising steel cords and the total sectional area, a, of steel wires is in the range of 5 to 14 $mm^2$ per 50 mm width. The cord angle of each of the inner belt layer 4d and the outer belt layer 4u to the tire circumferential direction EE' is 5° to 40°, and the cords of the inner belt layer 4d and the cords of the outer belt layer 4u cross each other.

Main grooves 6 extending in a tire circumferential direction EE' and subgrooves 7 crossing the main grooves are provided on the surface of the tread 1. The groove depth, d, of the main grooves 6 is in the range of 6.0 to 8.5 mm, and the thickness, t, of rubber under the grooves is in the range of 0.5 to 2.5 mm.

In accomplishing the above-described invention, the present inventors have made many faceted studies on factors having an influence on the cornering power of the radial tire with a view to attaining the technical task on the reduction in the weight of the tire. As a result, as shown in detail in experiment examples which will be described later, they have found that the groove depth of the grooves provided on the tread surface along the tire circumferential direction and the thickness of rubber under the grooves are main factors governing the cornering power and the cornering power increases with reduction in the groove depth of the grooves in the tire circumferential direction and the thickness of rubber under the grooves. This tendency is independent of the form of the grooves in the tire circumferential direction which is straight or zigzag. Further, this is independent of whether or not subgrooves are provided in the tire width-wise direction. As described above, however, when both the two belt layers comprise aramid fiber cords, a remarkable lowering of about 25% in the cornering power occurs. Therefore, it is almost impossible to compensate for the 25% lowering of the cornering power through the technical measure involving the groove depth of the grooves in the tire circumferential direction and the thickness of rubber under the grooves alone. However, it has been found that the object of the present invention can be attained when one of the two belt layers comprises steel cords and the cord density is in a certain range.

The present invention will now be described in more detail with reference to the following experiment examples.

Figure 3:
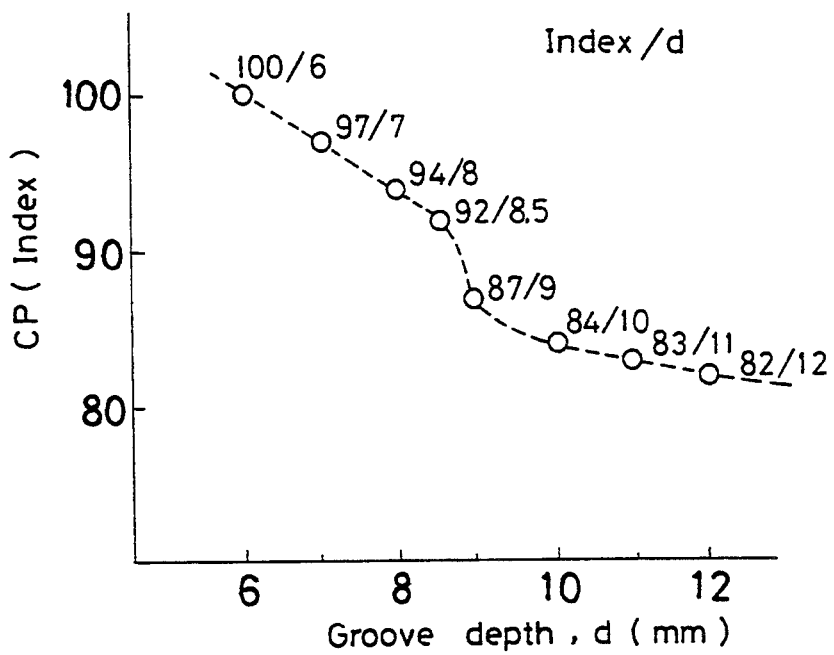
FIG. 3 is a graph showing the relationship between the groove depth, d, and the cornering power, CP.

The results of an experiment example on the relationship between the groove depth, d, and the cornering power, CP. are shown in FIG. 3. This experiment was conducted on eight radial tires having the following identical tire structure with only the groove depth, d, being varied as 6 mm, 7 mm, 8 mm, 8.5 mm, 9 mm, 10 mm, 11 mm and 12 mm.
Tread structure: as shown in FIG. 1
Tire size: 185/70R13
Belt structure:
   Number of belt layers: two
     Cords of inner and outer belt layers: aramid fiber cords 1500D/2
      end count=45 ends/50 mm
      cord angle=21°

Width of belt layers: outer layer/inner layer=120 mm/130 mm
Thickness of rubber under grooves=3.0 mm The cornering power, CP, was measured as follows. In a drum test, when the tire was run under a load of 450 kgf at a speed of 10 km/hr, the lateral force at a right slip angle of 1° and the lateral force at a left slip angle of 1° were measured, and the average value of both the measurements (average value of the absolute values) was expressed by an index using the measurement value of the tire having a groove depth of 6 mm as 100.

Figure 4:
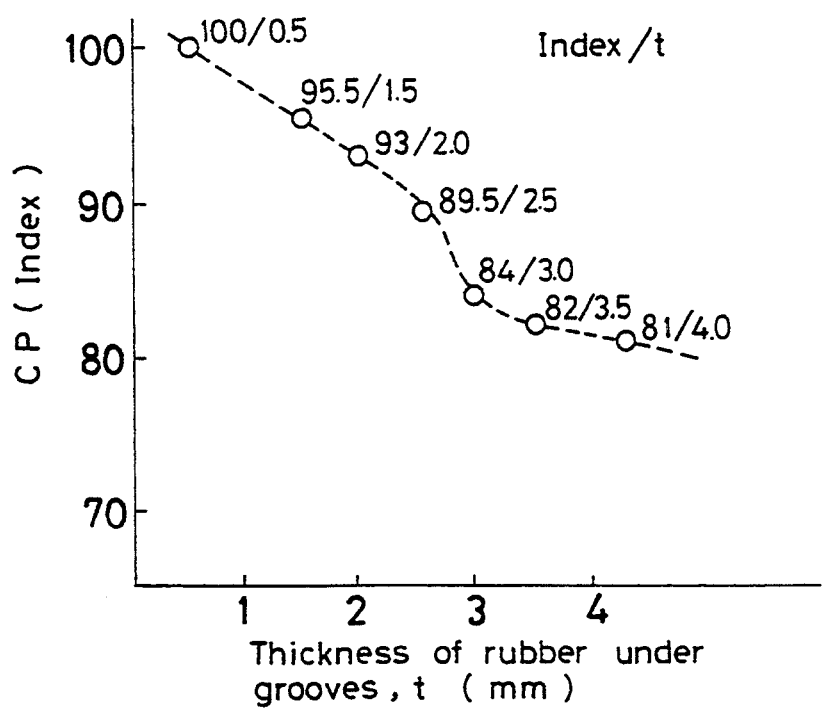
FIG. 4 is a graph showing the relationship between the thickness, t, of rubber under the grooves and the cornering power, CP.

The results of an experiment on the relationship between the thickness, t, of rubber under the grooves and the cornering power, CP, are shown in FIG. 4. This experiment was conducted on seven tires having the same tread structure, tire size and belt structure as those of the tires used in the above-described experiment and an identical groove depth of 8.5 mm with only the thickness, t, of rubber under the grooves being varied as 0.5 mm, 1.5 mm, 2.0 mm, 2.5 mm, 3.0 mm, 3.5 mm and 4.0 mm. The cornering power, CP, was measured in the same manner as that described above and expressed by an index using the measurement value of the tire having a thickness, t, of rubber under the grooves of 0.5 mm as 100.

Regarding the groove depth, as is apparent from FIG. 3, the cornering power, CP, increases with reduction in groove depth and rapidly increases when the groove depth becomes 8.5 mm or less. This tendency is not limited to the tire having the above-described size used in the test, and a similar tendency is observed also in tires having other sizes.

In the conventional radial tire, the groove depth is generally 8 to 11 mm. On the other hand, in the present invention, with consideration of the results shown in FIG. 3, the groove depth is limited to 6.0 to 8.5 mm, preferably 6.0 to 7.5 mm. The lower limit, i.e., 6.0 mm, is determined based on the abrasion life, and when the groove depth is smaller than this value, the practicability becomes poor.

Regarding the thickness, t, of rubber under the grooves, from FIG. 4, it is apparent that the cornering power, CP, increases with reduction in the thickness of rubber under the grooves and rapidly increases particularly when the thickness becomes 2.5 mm or less. This tendency is observed also in tires having other sizes. In the conventional radial tire, the thickness, t, of rubber under the grooves is generally 2.5 to 4 mm. On the other hand, in the present invention, with the consideration of the results shown in FIG. 4, the thickness of rubber under the grooves is limited to 0.5 to 2.5 mm, preferably 1.0 to 2.0 mm. The lower limit of the thickness, i.e., 0.5 mm, is a limit for protecting the belt cords and preventing the breaking of the cords.

As described above, the cornering power, CP, increases with reduction in the groove depth, d, of the grooves provided on the tread (main grooves) and the thickness, t, of rubber under the grooves. The effect of improving the cornering power, CP, derived from the groove depth, d, however, is up to about 9% of that in the case of the lower limit of the groove depth, i.e., 8.5 mm of the conventional tire even when use is made of the lower limit of the groove depth, i.e., 6.0 mm. Further, the effect of improving the cornering power, CP, derived from the thickness, t, of rubber under the grooves, however, is up to about 19% of that in the case of the lower limit of the thickness of rubber under the grooves, i.e, 3.0 mm, of the conventional tire even when use is made of the lower limit of the thickness of rubber under the grooves, i.e., 0.5 mm. For this reason, mere limitation of the groove depth, d, and the thickness, t, of rubber under the grooves cannot compensate for low bending rigidity of the belt layer comprising aramid fiber cords, so that it is difficult to attain a cornering power higher than that obtained in the conventional tire wherein the two belt layers each comprise steel cords.

In the present invention, the lowering in the cornering power in the case where two belt layers each comprise aramid fiber cords can be compensated for and increased to a level higher than that of the conventional tire having two belt layers each comprising steel cords while enjoying a reduction in the weight of the tire through the adoption of such a tire structure that the groove depth, d, and the thickness, t, of rubber under the grooves are reduced, one of the belt layers comprises aramid fiber cords with the other belt layer comprising steel cords and the total sectional area, $a$, of steel wires per 50 mm width is in a certain range.

Figure 5:
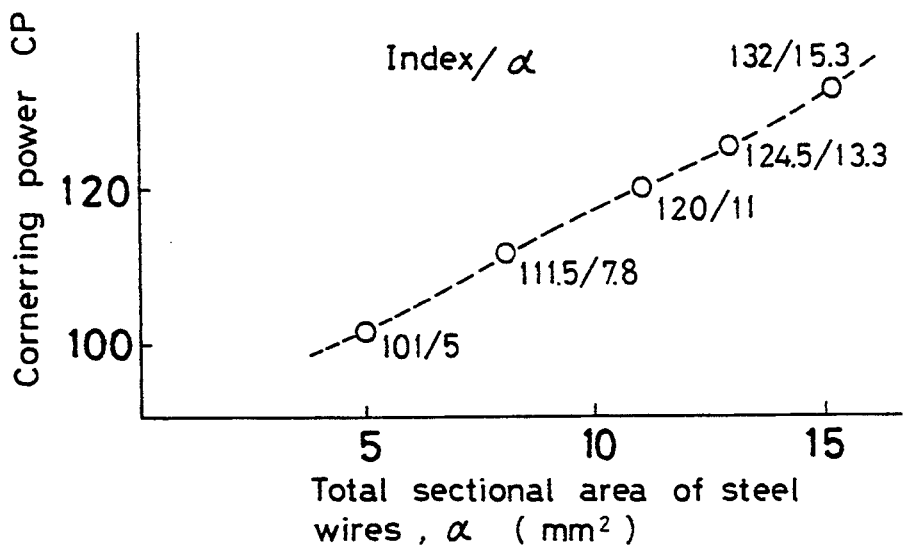
FIG. 5 is a graph showing the relationship between the total sectional area, $a$, of steel wires and the cornering power, CP.

The results of an experiment on the relationship between the total sectional area, $a$, of steel wires per 50 mm width of the steel belt layer and the cornering power, CP, regarding a radial tire wherein one of the belt layers comprises aramid fiber cords and the other belt layer comprises steel cords are shown in FIG. 5. This experiment was conducted on five tires having the following identical tire structure with only the total sectional area, $a$, of steel wires per 50 mm width of the steel belt layer being varied as 5 mm$^2$, 7.8 mm$^2$, 11 mm$^2$, 13.3 mm$^2$ and 15.3 mm$^2$ through the change of the cord structure and end count of the steel cord belt layer.
Tread structure: as shown in FIG. 1
Tire size: 185/70R13
Belt structure:
  Number of belt layers: two
    Cords of inner and outer belt layers: aramid fiber cords 1500D/2
      end count=45 ends/50 mm
      cord angle=21°
    Inner belt layer: steel cords
      cord angle=21°
    Width of belt layers: outer layer/inner layer=120 mm/130 mm
    Groove depth: 7.0 mm
    Thickness of rubber under grooves: 2.0 mm For comparison, a tire having the following structure wherein the two belt layers each comprise steel cords was used as the conventional tire.
Tread structure: as shown in FIG. 1
Tire size: 185/70R13
Belt structure:
  Number of belt layers: two
    Outer and inner belt layers:
      Cord structure: steel cords of 1×5 (0.25)
      End count=45 ends/50 mm
      Cord angle=21°
    Width of belt layers: Outer layer/inner layer=120 mm/130 mm
    Groove depth: 8.5 mm
    Thickness of rubber under grooves: 3.0 mm The cornering power, CP, of each of the above-described tires was measured in the same manner as that used in connection with FIG. 3 and expressed by an index using the measurement value of the conventional tire as 100.

Figure 6:
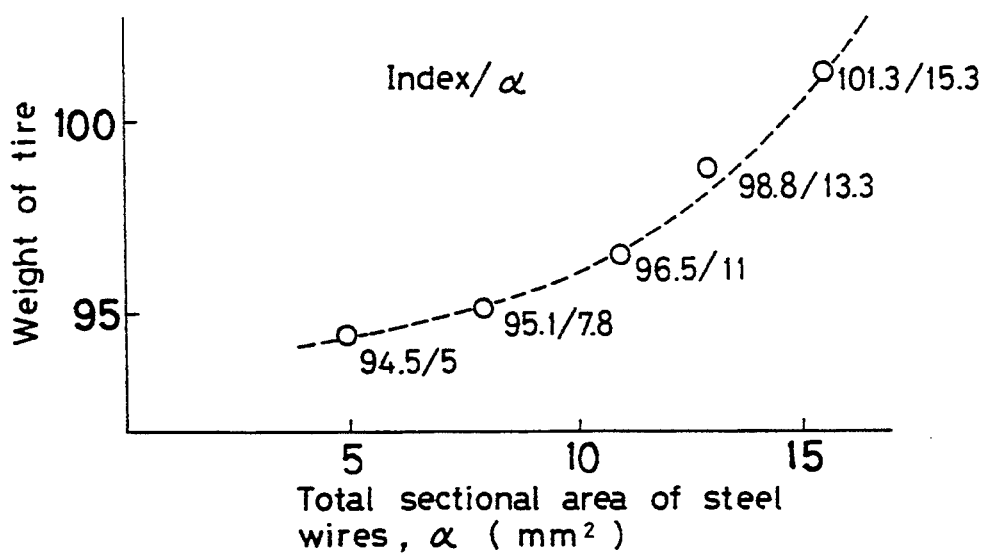
FIG. 6 is a graph showing the relationship between the total sectional area, $a$, of steel wires and the weight of the tire.

The results of an experiment on the relationship between the total sectional area, $a$, of steel wires per 50 mm width of the steel belt layer and the weight of the tire regarding the same tire as that used in the experiment in connection with FIG. 5 are shown in FIG. 6. The weight of the tire was expressed by an index using the weight of the conventional tire having two belt layers each comprising steel cords as 100.

As is apparent from FIG. 5, the cornering power, CP, can be improved to a level comparable to or better than that of the conventional tire having two belt layers each comprising steel cords when the above-described requirements for the groove depth, d, and the thickness, t, of rubber under the grooves are satisfied and the total sectional area, $a$, of steel wires in the steel belt layer is $a \geq 5$ mm$^2$ even though one of the belt layers comprise aramid fiber cords.

Regarding the weight of the tire, as is apparent from FIG. 6, when the total sectional area, $a$, of steel wires exceeds 14 mm$^2$, the weight of the tire becomes larger than that of the conventional tire having two belt layers each comprising steel cords, so that it becomes meaningless to intentionally reduce the weight of the tire through the use of a layer comprising aramid fiber cords as one of the two belt layers.

As is apparent from the results shown in FIGS. 5 and 6, in order to make the weight of the tire smaller than that of the conventional tire having two belt layers each comprising steel cords and make the cornering power equal to or better than that of the conventional tire, it is necessary to satisfy the above-described requirements for the groove depth, d, and the thickness, t, of rubber under the grooves and to set the total sectional area, $a$, of steel wires in the range of 5 to 14 mm$^2$, preferably in the range of 6.5 to 11.0 mm$^2$.

In the present invention, regarding the combination of a belt layer comprising aramid fiber cords with a belt layer comprising steel cords, the belt layer comprising aramid fiber cords and the belt layer comprising steel cords may constitute the outer belt layer and the inner belt layer, respectively, as described in the above-described experimental examples or vice versa. Further, when both ends of any one of the belt layers comprising aramid fiber cords and the belt layer comprising steel cords are folded back towards the center of the tread, the cornering power, CP, can be further improved. It is preferred for the belt layer comprising aramid fiber cords to be folded back. Further, although it is preferred to fold back the left and right ends of the belt layer symmetrically with each other, they may be asymmetrically folded back.

The aramid fiber cord used in the belt layer according to the present invention is preferably a twisted cord of a filament having a total denier of 500 to 5000D, preferably 2000 to 3000D. This twisted cord is subjected to a surface treatment with an adhesive, such as an epoxy resin, resorcin/formalin/latex (RFL), for the purpose of improving the adhesion of the cord to the coat rubber. The cords subjected to the surface treatment are woven into a tire cord fabric in the form of a reed screen which is then coated with a coat rubber so that the thickness of the coat rubber becomes 0.1 to 1.0 mm larger than the cord diameter. It is preferred to conduct the coating in such a manner that the thickness is a cord diameter plus 0.1 to 0.6 mm. Further, the two belt layers are laminated on top of the other in such a manner that the cord angle is 5° to 40°, preferably 15° to 30° to the tire circumferential direction and the belt cords cross each other. In this case, the width in the meridian direction of the tire is 80 to 130%, preferably 90 to 110% of the ground contact width of the tire.

There is no particular limitation on the steel cords, and various steel cords known as a cord for reinforcing the tire may be used. Examples of the steel cords include a cord having a structure of 2+7 and comprising steel wires having an element wire diameter of 0.22 mm, a cord having a structure of 1×5 and comprising steel wires having an element wire diameter of 0.25 mm and a cord having a structure of 1×2 and comprising steel wires having an element wire diameter of 0.25 mm. In these steel cords, the end count is adjusted so as to provide a total sectional area, $\alpha$, of steel wires per 50 mm width specified in the present invention.

Thus, when one of the two belt layers comprises aramid fiber cords with the other belt layer comprising steel cords, the groove depth and the thickness of rubber under the grooves are smaller than those of the conventional tire and the total sectional area, $\alpha$, of steel wires per 50 mm width of the belt layer comprising steel cords is in the range of 5 to 14 mm$^2$, a synergistic effect attained by these constitutional features enables the cornering power to be improved to a level equal to or better than the conventional tire having two belt layers each comprising steel cords, which contributes to an improvement in the driving stability while enjoying a reduction in the weight of the tire.

EXAMPLES

A tire 1 of the present invention, a tire 2 of the present invention, a tire 3 of the present invention. a conventional tire, a compactive tire 1, a comparative tire 2 and a comparative tire 3 were prepared. They had the following identical tire size and belt structure, an identical tread rubber composition specified in Table 2 and the following identical tread pattern with the groove depth, d, the thickness, t, of rubber under the grooves, the type of cords and structure of the inner and outer belt layers and the end count per 50 mm width and the total sectional area, $\alpha$, of steel wires in the belt layer comprising steel cords being varied as specified in Table 1.
Tire size: 185/70R13
Belt structure: as shown in FIG. 1
Number of belt layers: two
Width of belt layers: outer belt layer/inner belt layer = 120 mm/130 mm
Cord angle: 21° to the tire circumferential direction in both the outer and inner belt layers Tread pattern: Four straight main grooves having a width of 6 mm were provided within the ground contact region of the tread along the tire circumferential direction to form five ribs substantially equal to each other in the width. A plurality of subgrooves having a width of 4 mm and the same groove depth as that of the straight main groove are formed at intervals of about 26 mm in the radial direction of the tire to divide the ribs, thereby forming a block pattern wherein 72 wedge type blocks are arranged in five rows on the tire circumferential direction.

These seven types of tires were subjected to an evaluation of the cornering power, CP, in the same manner as that in the case of FIG. 3. The results of evaluation are given in Table 1 together with the comparison of the weight per tire. The evaluation value of the cornering power, CP, was expressed by an index using the measurement value of the conventional tire as 100, and the comparision of the weight per tire was expressed based on the weight of the conventional tire.

TABLE 1

|  | Conventional tire | Comparative tire 1 | Comparative tire 2 | Tire of the present invention 1 | Tire of the present invention 2 | Tire of the present invention 3 | Comparative tire 3 |
| --- | --- | --- | --- | --- | --- | --- | --- |
| d (mm) | 8.5 | 8.5 | 8.5 | 6.0 | 8.5 | 6.0 | 6.0 |
| t (mm) | 3.0 | 3.0 | 3.0 | 2.5 | 2.5 | 0.5 | 0.5 |
| inner belt layer |  |  |  |  |  |  |  |
| type of cords | steel | aramid | steel | steel | steel | steel | steel |
| cord structure | 1 × 5 (0.25) | 1500 D/2 | 2 + 7 (0.22) | 1 × 5 (0.25) | 2 + 7 (0.22) | 1 × 2 (0.25) | 1 × 2 (0.25) |
| end count | 45 | 45 | 39 | 45 | 39 | 55 | 45 |
| outer belt layer |  |  |  |  |  |  |  |
| type of cords | steel | aramid | aramid | aramid | aramid | aramid | aramid |
| cord structure | 1 × 5 (0.25) | 1500 D/2 | 1500 D/2 | 1500 D/2 | 1500 D/2 | 1500 D/2 | 1500 D/2 |
| end count | 45 | 45 | 45 | 45 | 45 | 45 | 45 |
| $\alpha$ (mm$^2$) | — | — | 13.3 | 11.0 | 13.3 | 5.4 | 4.4 |
| CP | 100 | 75 | 95 | 107 | 100 | 101 | 99 |
| weight of tire (g) | reference | −525 | −80 | −1105 | −260 | −1970 | −2030 |

TABLE 2

| Compounding ingredient | Amount of compounding (pt. wt.) |
| --- | --- |
| SBR[1] | 137.5 |
| zinc oxide | 1.5 |
| stearic acid | 2.0 |
| antioxidant[2] | 1.8 |
| wax[3] | 1.0 |
| carbon black HAF | 70.0 |
| aromatic oil | 3.0 |
| vulcanization accelrator[4] | 2.5 |
| sulfur powder | 2.1 |

Note: In Table 2,
[1] styrene-butadiene copolymer rubber "Nipol 1712" manufactured by Nippon Zeon Co., Ltd.
[2] "Nocrac 6C" manufactured by Ouchi Shinko Chemical Industrial Co., Ltd.
[3] "Sunnoc" manufactured by Ouchi Shiko Chemical Industrial Co., Ltd.
[4] "Sanceler 232-MC" manufactured by Sanshin Chemical Ind. Co., Ltd.

As is apparent from Table 1, although the comparative tire 1 wherein both the belt layers comprise aramid fiber cords can reduce the weight per tire by 525 g as compared with the conventional tire, the cornering power, CP, lowers by as large as 25%.

By contrast, the tire 1 of the present invention having a belt comprising an inner belt layer of steel cords and an outer belt layer of aramid fiber cords, a reduced groove depth, d, and a reduced thickness, t, of rubber under the grooves has an improved cornering power, CP, while enjoying a smaller weight than that of the conventional tire.

Further, as is apparent from the results on the tire 2 of the present invention, even when the groove depth, d, is 8.5 mm which is substantially the same as that of the conventional tire, it is possible to attain a cornering power, CP, comparable to that of the conventional tire while enjoying a reduction in the weight of the tire if the total sectional area, $\alpha$, of steel wires is 13.3 mm$^2$ which is close to the upper limit specified in the present invention.

Further, as is apparent from the results on the tire 3 of the present invention, even when the total sectional area, $\alpha$, of steel wires is about 5.4 mm$^2$ which is close to the lower limit specified in the present invention, it is possible to attain a cornering power, CP, comparable to that of the conventional tire while enjoying a reduction in the weight of the tire if the groove depth, d, and the thickness, t, of rubber under the grooves are reduced.

As is apparent from the results on the comparative tire 2, it has been confirmed that even though the construction of the belt is the same as that of the tire 2 of the present invention, no significant reduction in the weight of the tire can be attained and the cornering power, CP, cannot be ensured if the groove depth, d, and the thickness, t, of rubber under the grooves are the same as those of the conventional tire.

Further, as is apparent from the results on the comparative tire 3 wherein the total sectioanl area, $\alpha$, of steel wires is 4.4 mm$^2$, it has been confirmed that, in this tire, even though the groove depth, d, and the thickness, t, of rubber under the grooves are the same as those of the tire 3 of the present invention, the cornering power, CP, cannot be ensured although the weight of the tire can be remarkably reduced.

What is claimed is:

1. A pneumatic radial tire for a passenger car, which includes a plurality of grooves provided on the surface of a tread and extending at least in a tire circumferential direction and a belt having a double layer structure and provided within the tread, characterized in that the depth of the grooves is in the range of 6.0 to 8.5 mm, the thickness of a rubber under the groove defined as the distance from the bottom of the groove to the cord surface of the outermost belt layer independent of any belt cover layer is in the range of 0.5 to 2.0 mm, one of the belt layers comprises aramid fiber cords with the other belt layer comprising steel cords, the steel cords having a cord structure in which a plurality of steel wires are twisted together, the angle of each of the aramid fiber cords and the steel cords to the tire circumferential direction is 5° to 40°, the aramid fiber cords cross the steel cords, and the total sectional area, $\alpha$, of steel wires per 50 mm width of the belt layer comprising steel cords is 5 to 14 mm$^2$.

2. A pneumatic radial tire for a passenger car according to claim 1, wherein the belt includes an outer layer which comprises aramid fiber cords, the inner belt layer comprising steel cords.

3. A pneumatic radial tire for a passenger car according to claim 1, wherein the belt includes an inner layer which comprises aramid fiber cords, the outer belt layer comprising steel cords.

4. A pneumatic radial tire for a passenger car according to claim 1, wherein both ends of at least one belt layer is folded back towards the center of the tread.

5. A pneumatic radial tire for a passenger car according to claim 4, wherein both ends of one belt layer comprising aramid fiber cords is folded back towards the center of the tread.

6. A pneumatic radial tire for a passenger car according to claim 4, wherein both ends of the belt layer are folded back symmetrically with each other.

7. A pneumatic radial tire for a passenger car according to claim 1, wherein said aramid fiber cord is a twisted cord comprising filaments and said cord has a total denier of 500 to 5000D.

* * * * *